April 27, 1926.
J. CANTOR
ELECTRIC COFFEE URN
Filed June 23, 1925
1,582,165
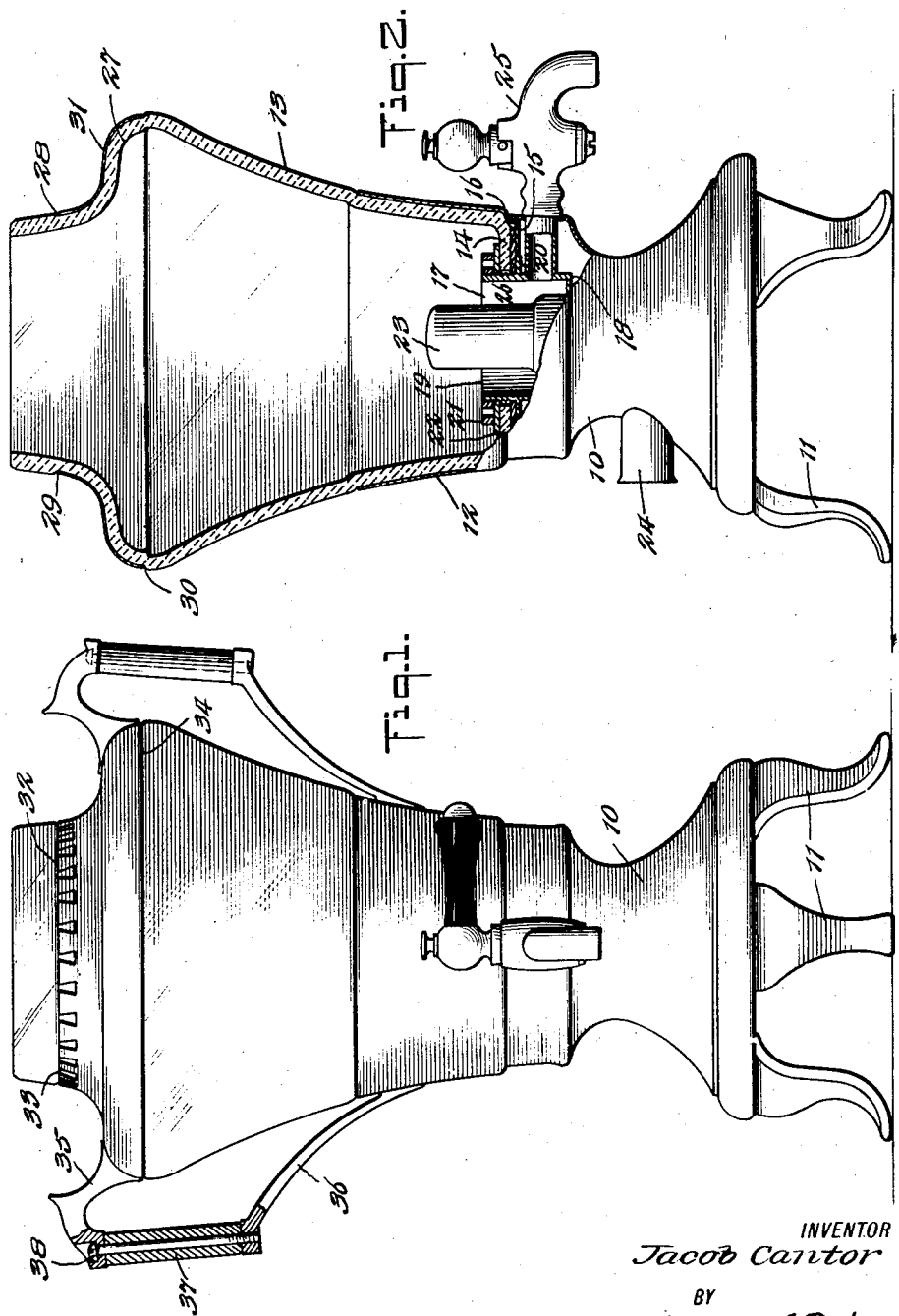
INVENTOR
Jacob Cantor
BY
Warren S. Oston
ATTORNEY Patented Apr. 27, 1926.

1,582,165

UNITED STATES PATENT OFFICE.

JACOB CANTOR, OF BROOKLYN, NEW YORK.

ELECTRIC COFFEE URN.

Application filed June 23, 1925. Serial No. 38,973.

*To all whom it may concern:*

Be it known that I, JACOB CANTOR, a citizen of the United States, and resident of Brooklyn, in the county of Kings and State of New York, have invented certain new and useful Improvements in Electric Coffee Urns, of which the following is a specification.

The invention relates in general to an electric liquid heater herein shown to be in the form of a two handle coffee urn, of the type of such devices which are constructed partly of metal and partly of a bowl or receptacle formed of glass or similar pottery material.

The primary object of the invention is to provide a simplified and at the same time artistic form of electric liquid heater of the combined glass and ornamental metallic design.

Another object of the invention is to provide in connection with such a design an assembly of a heating unit with the glass and metal posts organized and arranged to feature economy in current consumption and incidentally utilize the maximum number of thermal units generated by the heating unit to perform useful work in heating the liquid contents and not unduly dissipate the heat in radiation from the metal parts.

Incidental to this object it is a desideratum of the invention to minimize heat losses; to position jointures in such way that the difference in coefficiency of expansion between the glass and metal will not cause leakage therebetween and the invention particularly features the disposition of the heating unit in spaced and liquid insulated relation to the glass bowl or receptacle so as to prevent localizing of heat expansion at any particular portion of the glass body.

Another object of the invention is to provide in connection with the device above outlined an assembly of glass and metal which will feature a rugged construction and at the same time minimize in the amount of metal used to design such construction.

Still another object of the invention is to provide an urn design which will be formed largely of a glass bowl but with the requisite handles securely attached to the glass portion by rugged connections and in such way as will distribute strain over a material area of the glass bowl and at the same time insulate the handles from the hot portions of the construction.

Various other objects and advantages of the invention will be in part obvious from an inspection of the accompanying drawings and in part will be more fully set forth in the following particular description of one form of device embodying my invention, and the invention also consists in certain new and novel features of construction and combination of parts hereinafter set forth and claimed.

In the accompanying drawings:—

Figure 1 is a view in side elevation illustrating a preferred embodiment of the invention; and Figure 2 is a view partly in side elevation and partly in vertical section taken axially through the upper portion of the device and at right angles to the showing in Figure 1.

In the following description and in the claims, parts will be identified by specific names for convenience of expression but they are intended to be as generic in their application to similar parts as the art will permit.

In the drawings there is shown a Venturi-tube shaped base 10 in the form of a sheet metal shell provided with feet 11. The shell includes an open top in which is fitted an open top metal cup hereinafter referred to as a receptacle shell 12. Disposed in superposed relation therein is a glass receptacle 13 having its lower portion fitted in the shell 12 and with its bottom 14 spaced from the bottom 15 of the shell 12 by means of an insulating washer 16. Extending vertically through alined openings in the center of the bottoms 14 and 15 is a metallic heating tube 17 having a closed bottom 18 and an open top 19 opening into the receptacle 10 above the bottom 14 thereof. The heating tube is secured to the bottoms 14 and 15 by means of an outstanding flange 20 extending from the heating tube intermediate its top and bottom and engaging the underside of the bottom 15. The heating tube is exteriorly threaded and a jam nut 21 is screwed on the tube and bears on a washer 22 positioned between the same and the upper side of the glass bottom 14.

Centrally positioned in the heating tube 17 and resting on the bottom thereof is an electric heating unit 23 of conventional structure and supplied from the house circuit by a socket engaging in the socket recess 24 projecting laterally from the base 10.

A drain off faucet 25 extends horizontally through the side of the base 10 and discharges from the heating tube 17 adjacent the bottom thereof. The diameter of heating unit 23 is less than the diameter of the heating tube 17 so that an annular well 26 is positioned between the lower portion of the heating unit and the encircling wall forming the heating tube 17.

The form of the invention illustrated is provided with a pair of handles on opposite sides to form the usual urn construction and as these handles are similar in construction the detailed description of one will be sufficient for the other. The upper portion of the glass receptacle is formed into a shoulder portion 27 and this shoulder portion is provided with a shallow recess 28 defined at top and bottom by vertically spaced and parallel shoulders 29 and 30, facing each other. Fitted within the recess is an endless metal band 31 the upper edge 32 of which is scalloped or slitted so as to form a resilient edge 33 designed to fit under and in resilient, spring-pressed engagement with the shoulder 29 when the opposite straight edge 34 is resting on top of and engaging the shoulder 30. The metal band 31 is provided on opposite sides with metallic outstanding arms 35 and similarly the receptacle shell 12 is provided on opposite sides with upwardly projecting outstanding arms 36. Fitted between the outer extremities of the outstanding arms 35 and 36 is a handle 37 preferably formed of wood or other insulating material. A bolt 38 extends through the arms and axially through the handle so as to secure the handle in position and at the same time provide a construction by means of which a new handle can readily be substituted in case of necessity to replace this part.

In operation it is understood that the device functions as is usual in liquid heaters of this character. The heat generated by the unit 23 heats the limited amount of water or other liquid in the well 26 so that there is a relatively quick heating of this limited amount of liquid. The upper portion of the heating unit which intrudes into the glass receptacle heats the liquid therein but in either case it is appreciated that there is a well of water or liquid between the heating unit and the metal parts which engage the glass receptacle. It is appreciated that even in withdrawing the heated liquid it is taken through the faucet which is in spaced relation to the glass receptacle and this faucet does not extend through the glass receptacle as is common in constructions of this character. The liquid is withdrawn from its zone of highest temperature adjacent the heating unit so that the liquid can be withdrawn as soon as it is heated permitting the surplus heat to rise up with the liquid by connection into the glass receptacle.

Should it be desired to demount the parts it is simply necessary to loosen the holding nut engaging the heating tube ready access to which nut is provided through the wide open top of the glass receptacle. With the removal of the clamping nut the washers may be replaced if desired or the glass receptacle may be lifted from the socket provided by the shell, thus exposing all parts of the heating tube and the conduit leading to the faucet for inspection, cleaning and repair.

The device disclosed features a relatively cool handle for not only is the handle itself made of insulating material but the insulating character of the glass receptacle will tend to minimize heat conductivity to the upper metal band 31 and thus minimize tendency for heat to be conducted along the upper arms forming the upper portion of the handles.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:—

1. In a device of the class described, the combination of an open top metallic base, a receptacle shell fitted on said open top and provided with an opening in the bottom, a glass receptacle fitted in said receptacle shell and having an opening in the bottom thereof, a heating tube having a closed bottom and an open top intruded through the openings in the receptacle shell and receptacle, clamping means for securing the heating tube to the receptacle and to the receptacle shell, a faucet extending through the base and opening from the heating tube and a heating unit centered in the heating tube and projecting above the same into the glass receptacle.

2. In an electric liquid heater, the combination of a base, an open top heating tube supported from the base, an electrically energized heating unit centered in the tube and spaced from the sides thereof to provide a liquid well between the heating unit and the side of the heating tube, an open bottom faucet discharging through a side of the heating unit and a glass receptacle supported on the base, positioned above the faucet and having the heating tube intruded into the same through the open bottom thereof.

3. In an electric liquid heater, the combination of a glass receptacle having an opening in the bottom thereof and adapted to contain the liquid to be heated, a heating tube located in said opening and in part forming the bottom of the receptacle, means for securing the tube to the receptacle, and a heating unit centered in the heating tube and in spaced relation to the sides thereof and projecting upwardly into the interior of, and spaced from the inner side of the glass receptacle and adapted to be surrounded by the liquid in the receptacle and tube.

4. In an electric liquid heater, the combination of a metallic base, a glass receptacle supported from the base and having an open bottom, a heating tube carried by the base and intruded into the receptacle through its open bottom.

5. In an electric liquid heater, the combination of a metallic base, a glass receptacle supported from the base, heating means intruded through the bottom of the glass receptacle and mounted on the base and means for insulating the base from the glass receptacle.

6. In a device of the class described, the combination of a receptacle shell, a glass receptacle fitted in said shell and extending above the same, a metal band secured to the upper portion of the glass receptacle and spaced above the receptacle shell, and a handle offset from and extending vertically across the glass receptacle, said handle having its lower end secured to the receptacle shell and its upper end secured to the metal band.

7. In a device of the class described, the combination of a glass bowl having a shoulder portion, a metal band fitted to the shoulder portion and provided with an arm, a shell surrounding the glass bowl and spaced below the band, said shell provided with an arm and an insulating handle secured between said arms.

8. In an electric liquid heater, the combination of a metallic base provided with an outstanding arm, a glass receptacle mounted on said base and provided in spaced relation to the base with a recessed portion, a resilient metal band sprung into said portion and provided with an outstanding arm, a handle positioned between the outstanding arms and a bolt passed through the arms and handle for securing the same.

Signed at New York in the county of New York and State of New York this 22nd day of June A. D. 1925.

JACOB CANTOR.